Figure 1:
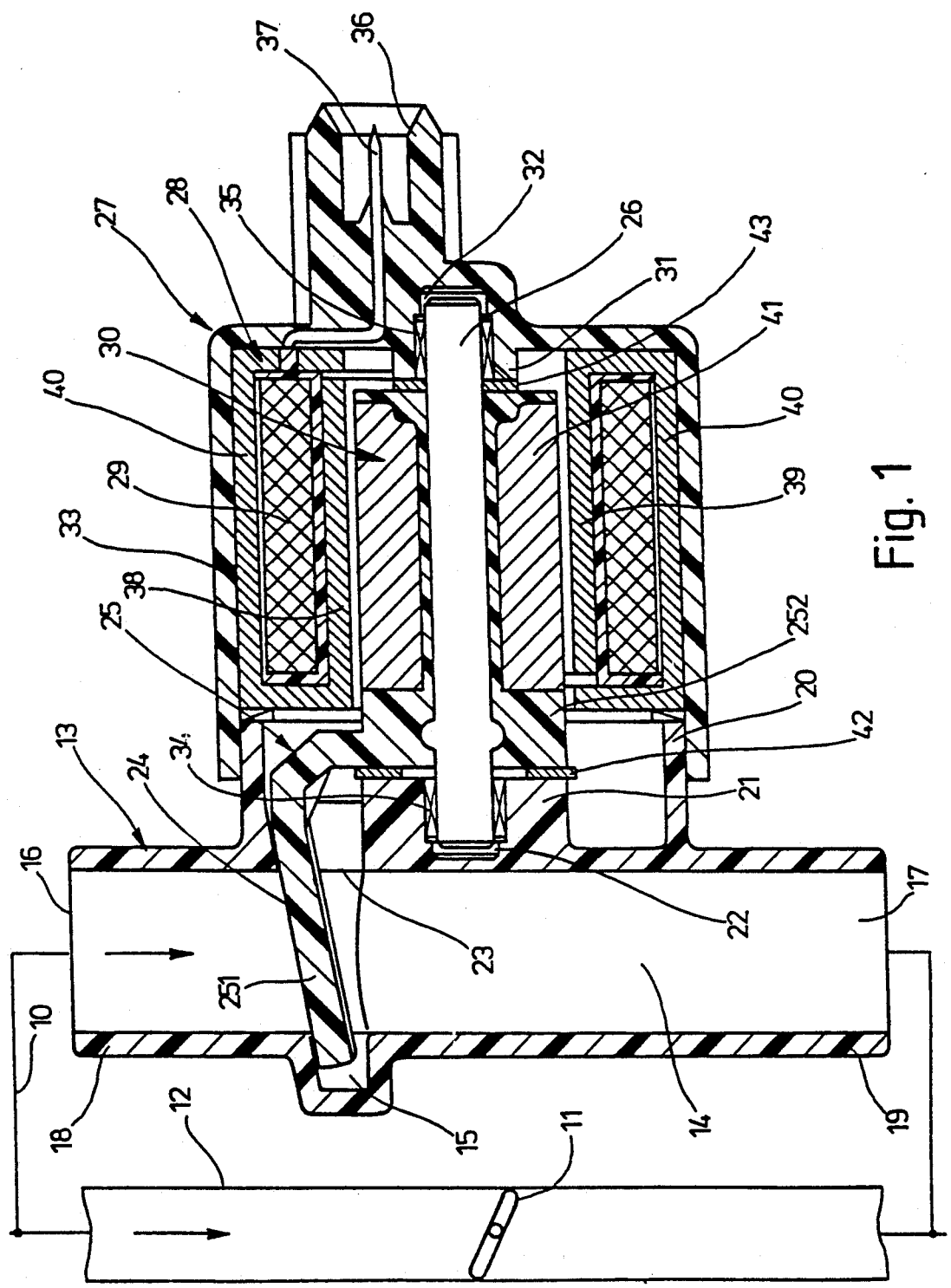

United States Patent [19]

Kalippke et al.

[11] Patent Number: 5,232,197
[45] Date of Patent: Aug. 3, 1993

[54] CONTROL DEVICE

[75] Inventors: Harald Kalippke, Benningen; Manfred Franz, Ditzingen; Erhard Renninger; Johannes Meiwes, both of Markgroeningen; Albert Gerhard, Tamm; Uwe Hammer, Schwieberdingen, all of Fed. Rep. of Germany

[73] Assignee: Robert Bosch GmbH, Stuttgart, Fed. Rep. of Germany

[21] Appl. No.: 910,304

[22] PCT Filed: Nov. 15, 1991

[86] PCT No.: PCT/DE91/00893
§ 371 Date: Jul. 21, 1992
§ 102(e) Date: Jul. 21, 1992

[87] PCT Pub. No.: WO92/10662
PCT Pub. Date: Jun. 25, 1992

[30] Foreign Application Priority Data

Dec. 5, 1990 [JP] Japan ................. 2-4038762

[51] Int. Cl.$^5$ ............................................. F16K 31/04
[52] U.S. Cl. .......................... 251/129.11; 251/129.12
[58] Field of Search ..................... 251/129.11, 129.12

[56] References Cited

U.S. PATENT DOCUMENTS 4,494,517  1/1985  Kratt et al. ................. 251/129.11 X
4,895,344  1/1990  Brand et al. ..................... 251/129.11

FOREIGN PATENT DOCUMENTS 3313830  11/1984  Fed. Rep. of Germany .
8805211   9/1989  Fed. Rep. of Germany .
 853396  11/1960  United Kingdom .

Primary Examiner—Arnold Rosenthal
Attorney, Agent, or Firm—Edwin E. Greigg; Ronald E. Greigg

[57] ABSTRACT

A control device for the control of an opening cross-sectional area of a flow duct, in particular for internal combustion engines, comprising three sub-assemblies, an actuator housing with flow channel and setting window, a rotor with a rotary valve for controlling the window opening, and a drive housing with stator and stator winding. For setting a required air gap between the rotary valve and the setting window, a control section of the rotary valve covering the setting window is designed as a cone envelope segment, and is inclined at an acute angle to the rotor axis. The window lying in a cone envelope plane is located at the same angle of inclination. By means of a spacing disk between the rotor, with the rotary valve affixed thereon, and the actuator housing, the air gap is set and fixed as required.

20 Claims, 3 Drawing Sheets

CONTROL DEVICE

STATE OF TECHNOLOGY

The invention is based on a control device for regulating the opening of a cross sectional area of a flow line, in particular for internal combustion engines.

In a known control device of this type (DE 32 00 096 A1), the two-part drive housing comprises a hollow cylinder which is pushed onto and fixed to the stub, and a cap which closes off the hollow cylinder on the front face, this cap being equipped with a plug which is connected to the armature winding. The stator held on the hollow cylinder has two permanent magnet poles, whilst the rotor carries the armature winding in axial grooves. The armature comprises two windings set at 90° to each other and acting in opposite directions, with these windings being connected with the plug via slip rings. The rotor, together with the rotary valve, is fitted torsionally rigid on a bearing sleeve which is supported via two radial bearings located at an axial distance from one another on the rotor axis, which in turn is held in the two locating apertures of the boss formed on the actuator housing on the one side, and on the cap of the drive housing on the other side. The control part of the rotary valve, which projects into the setting chamber of the actuator housing and there acts in conjunction with the setting window, and which has an arc-shaped cross section, is located coaxially to the rotor axis.

The known control device comprises a total of three subassemblies which are manufactured separately and which permit simple final assembly; namely the actuator housing with an actuator chamber and boss, the bearing sleeve onto which are fixed the rotor with the rotor winding, rotary valve and slip rings, and the drive housing with stator, connector plug and boss. However, in the manufacture and pre-assembly of the three subassemblies, attention must be paid to adherence to close tolerance, so that after the control device has been assembled, there is sufficient play between the rotary valve and the setting window.

ADVANTAGES OF THE INVENTION

By contrast, the control device in accordance with this invention, has an advantage that it is possible to optionally set the air gap at the setting window, in a simple manner. The thickness of the spacing disc between the front faces of the bosses on the actuator housing and the fixing part of the rotary valve, which is connected torsionally rigid to the rotor, is of decisive importance for the air gap size. Close tolerance limits in manufacture are thus no longer necessary.

In this way the precondition is at the same time provided for combining the control device; which comprises three functional units, namely the actuator housing, the rotor with the rotary valve, and the drive housing with the stator; with one another in a type of a module system, and for example, using modified functional units adapted to the respective technical requirements, such as an actuator housing with flow channel which is elongated, angled-off, or rotated about 180°, or actuating drives of different designs. The required clearance between the rotary valve and setting window is ensured in each case by appropriately selecting the thickness of the spacing disk.

After setting the axial clearance of the rotor with an appropriate spacing disk between the front faces of the rotor at one end and of the coaxial boss formed on the drive housing at the other end, the drive housing is connected inseparably with the actuator housing at the stub.

In a preferred embodiment of the invention, the rotor and the fixing part of the rotary valve is held, torsionally rigid, on a rotor shaft which is carried in radial bearings, which in turn are located in the locating apertures of the bosses formed on the actuator housing and drive housing.

In a further embodiment of the invention, the rotor is fixed on a bearing sleeve, which is of one piece with the fixing part of the rotary valve. The bearing sleeve is supported on an axis via two radial bearings located at an axial distance, with this axis being held in the two locating apertures of the bosses formed on the actuator housing and drive housing. For preference, the axis is pressed into the locating aperture of the boss formed on the actuator housing, and after the assembly of the drive housing it projects into the other locating aperture of the boss formed on the drive housing. The rotary valve is preferably manufactured of plastic, with the formation of the bearing bush and the fixing of the rotor being effected by plastic extrusion during the injection moulding.

DRAWING

Figure 2:
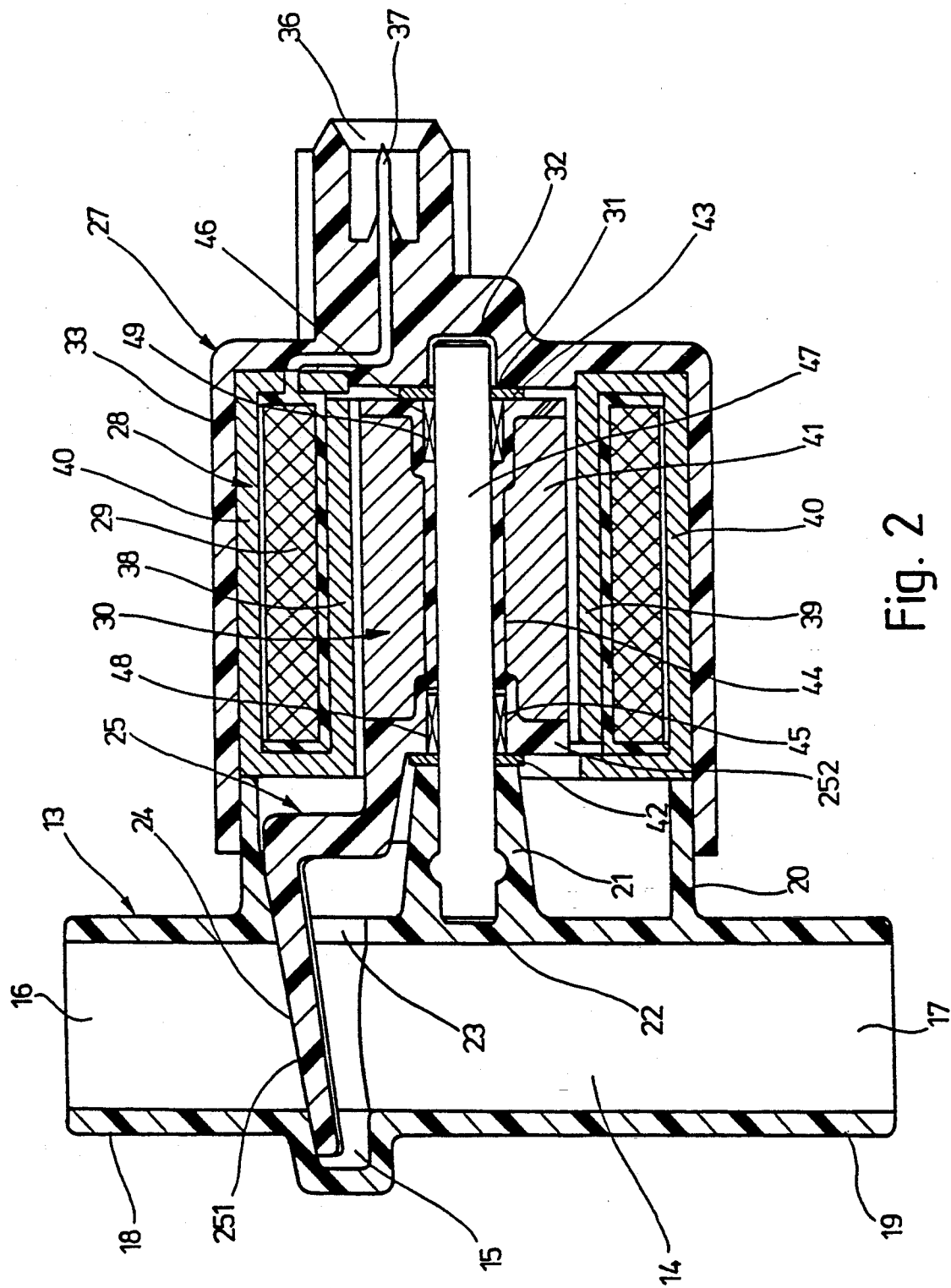
Figure 3:
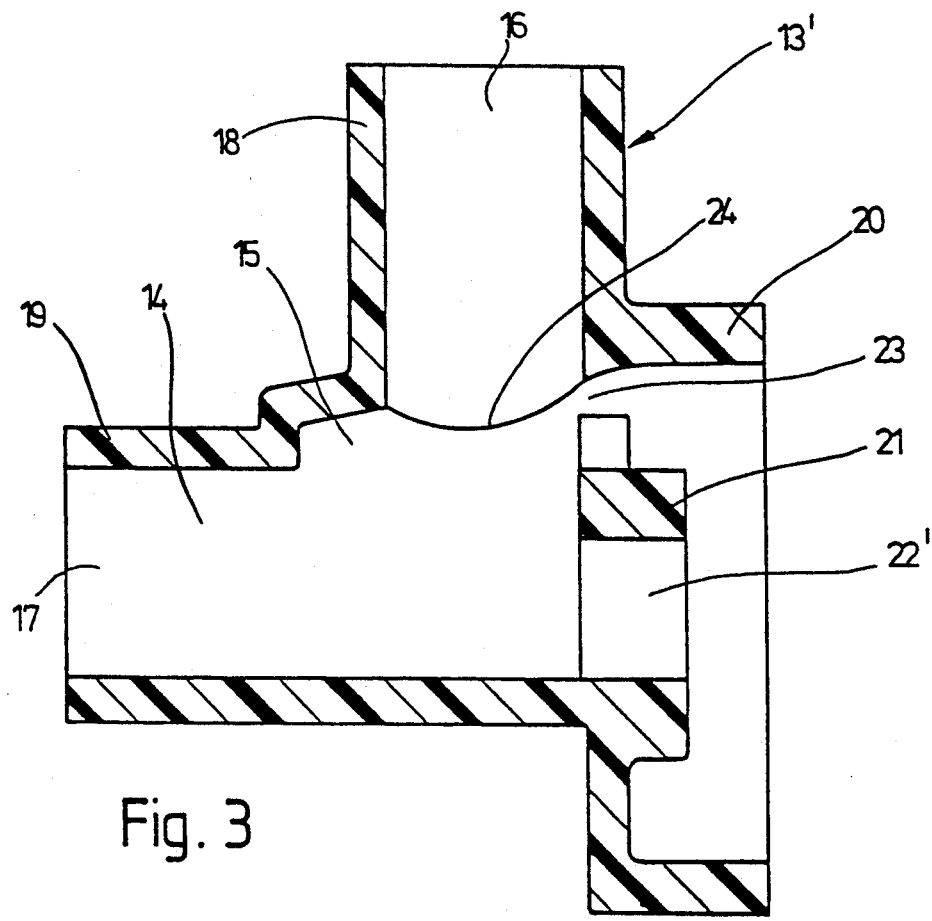
Figure 4:
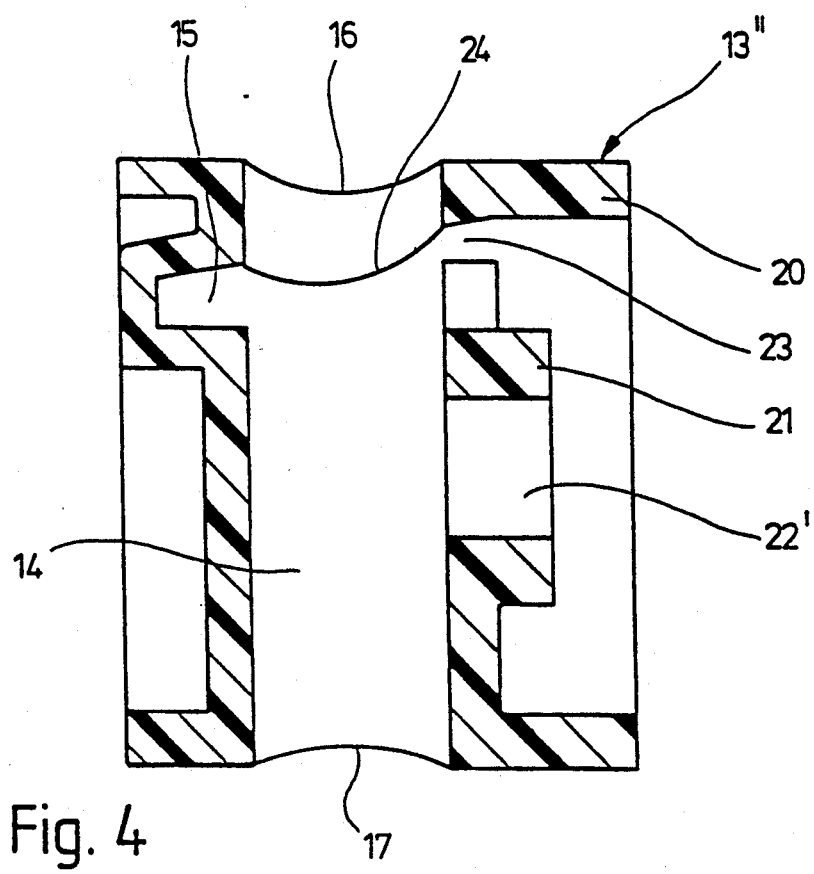

The invention is explained in greater detail in the following description, on the basis of design examples shown in the drawing. The figures show the following:

FIGS. 1 and 2 show respectively a longitudinal cross-section of a control device in accordance with a first and second design example, and FIGS. 3 and 4 show respectively a longitudinal cross-section of a modified actuator housing of the control device in FIG. 1, in accordance with the two design examples.

DESCRIPTION OF THE DESIGN EXAMPLES

The control device shown in longitudinal cross-section in FIG. 1 serves to control the opening of the cross-sectional area of a bypass duct 10 around a schematically represented throttle valve 11 in the induction pipe 12 of an internal combustion engine for the purpose of idling speed control. The control device has an actuator housing (13) of plastic, in which are formed a flow channel 14 and a setting chamber 15, which is penetrated by the flow channel 14. The flow channel 14 ends in an inlet port 16 and an outlet port 17, in an inlet connection stub 18 or an outlet connection stub 19. The connection of the flow channel 14 to the induction pipe 12 of the internal combustion engine is via hose connectors which are pushed onto the inlet stub 18 and the outlet stub 19.

Projecting from the actuator housing 13, at right angles to the housing axis, is a hollow cylindrical stub 20, which coaxially encompasses boss 21 with a coaxial locating aperture 22 with radial clearance. Between the boss 21 and the stub 20, in the region of the setting chamber 15, an arc-shaped slot 23 is provided in the wall of the actuator housing 13. In the setting chamber 15, a setting window 24 is formed in the direction of the flow channel 14, which lies on a plane formed by a portion of the envelope of a cone, and thus extends in the longitudinal cross-section in accordance with FIG. 1, obliquely to the flow channel 14. With the axis of the boss 21, the plane of the setting window plane encompasses an acute angle. The opening of the setting window 24 is controlled by a rotary valve 25 which, with a cone-segment shaped control part 251, projects through the slot 23 into the setting chamber 15, and extends parallel to the setting window 24. The control part 251, as a single piece, changes to a ring-shaped fixing section 252, which fits torsionally rigid on a rotor shaft 26 of an actuating drive 27. The control part 251 is aligned in such a way that with the axis of the rotor shaft 26, it encloses the same acute angle as the setting window 24 with the axis of the boss 21.

The actuating drive 27 for turning the rotary valve 25 consists of a stator 28 with stator winding 29 and a permanent magnet rotor 30 which is mounted torsionally rigid on the rotor shaft 26. The stator 28 is held on a cup-shaped drive housing 33, which with its open front face is pushed over the stub 20 and fixed there. A coaxial boss 31, with coaxial locating aperture 32, projects coaxially to the housing axis, at the base of the drive housing 33. In the locating apertures 22 and 32 of the two bosses 21, 31 which are formed at one end on the actuator housing 13 and at the other end on the drive housing 33, a radial bearing 34 or 35 is located respectively, in which the rotor shaft 26 is held. On the outside on the base of the drive housing 33, a connector plug 36 is molded on in one piece, two plug contacts 37 of which are connected with the ends of the stator winding 29. The drive housing 33 is manufactured of plastic, with the connector plug 36 and the boss 31 being molded on in one piece.

The stator 28 has two claw poles 38, 39, offset at 180° to one another in the circumferential direction, which are connected at axially opposite front faces respectively with a ring casing 40 which encompasses the claw pole 38, 39 with radial clearance. The stator winding 29 is set as a toroid coil in the annular space formed by the ring casing 40 and the claw poles 38, 39. The two-pole permanent magnet rotor 30 consists of a hollow cylindrical permanent magnet 41 with diametric magnetisation direction, which is fixed on the rotor shaft by means of plastic molding. When molding the rotary valve 25, which is manufactured of plastic, the rotor shaft and the hollow cylindrical permanent magnet 41 are also placed in the injection mold so that the plastic-coating of rotor shaft 26 and magnet 41 takes place simultaneously.

The control device described above consists of three functional units, namely of the actuator housing 13 to be connected to the induction pipe, the rotor 30 with rotor shaft 26 and rotary valve 25, and the drive housing 33 with stator 28 and stator winding 29. In the final assembly of the three components a spacing disk 42 is inserted between the front face of the boss 21 formed on the actuator housing 13, and the opposite front face of the fixing part 252 of the rotary valve 25. The axial thickness of this spacing disk 42 must be of such dimensions that a desired air gap is set between the cone-segment-shaped control part 251 of the rotary valve 25 and the setting window 24 lying in a cone envelope plane, with this air gap ensuring on the one hand sufficient clearance for the rotation of the rotary valve 25, and on the other hand sufficient coverage of the setting window 24 by the rotary valve 25. The permitted axial clearance of the rotor 30 in the radial bearings 34, 35 is determined by an spacing disk 43 which lies between the front face of the boss 31 formed on the drive housing 33, and the front face of the rotor 30. The axial thickness of the spacing disk 43 determines the possible axial clearance of the rotor 30. After setting the operating point of the rotary valve 25 (defined opening cross section in the setting window with currentless actuating drive) by turning the actuator housing 13 and the drive housing 33 towards one another, the latter is inseparably connected, e.g. by laser welding, adhesion, crimping etc., with the stub 20. The slot 23 in the actuator housing 13, through which the control part 251 of the rotary valve 25 projects, simultaneously forms a stop to limit the rotation angle of the rotary valve 25.

By separating the control unit into the three functional units described above, actuator housings 13 of different designs can be used on the unmodified actuator drive 27, which through their varying designs fulfill the specific technical requirements in individual cases. Examples of such modified actuator housings are shown in longitudinal section in FIGS. 3 and 4. In the actuator housing 13' in FIG. 3, the flow channel 14 is turned around a right angle, so that the inlet stub 18 and the outlet stub 19 are set at right angles to one another. The locating aperture 22' in the boss 21 is designed as a straight-through drilled hole, and not as a blind bore as in FIG. 1. This actuator housing 13 can be easily connected with the two other functional units of drive housing 33 with stator 28 and stator winding 29, and rotor 30 with rotary valve 25. Through appropriate selection of the spacing disk 42, the air gap between the control part 251 of the rotary valve 25 and the setting window 24 is set.

The actuator housing 13" in FIG. 4 is suitable for a so-called integrated solution, in which the actuator housing 13" is set in a bypass duct formed on the induction pipe. In comparison with the actuator housings 13 and 13' in FIGS. 1 and 3, inletand outlet stubs 18 and 19 are not longer required, nor are the connection tubes to the induction stub.

Further modifications of the actuator housing 13, as a flanged design with the flow channel turned through 180°, for screwing onto the induction pipe 12, are also possible, as are different designs of stator and rotor of the actuating drive.

The control device shown in longitudinal cross-section in FIG. 2 is slightly modified vis-a-vis the control device described above in relation to FIG. 1. The alteration comprises the rotor 30, once again designed as a hollow cylindrical permanent magnet 41 with diametric magnetisation direction, located on a bearing sleeve 44 which is of one piece with the rotary valve 25, and the bearing shell 44 being supported on an shaft 47 via two radial bearings 45, 46 located at an axial distance from one another, with this shaft in turn being pressed into the locating aperture 22 in the boss 21 formed on the actuator housing 13. In the control device as finally assembled, the free end of the shaft 46 enters fully into the locating aperture 22 of the boss 31 formed on the drive housing 33. The two radial bearings 45, 46 are held in grooves 48, 49 of the bearing sleeve 44. The rotary valve 25 is once again manufactured of plastic, and during the injection process the bearing sleeve 44 is molded on at the same time, and the permanent magnet 41 is fixed on the bearing sleeve 44 by means of plastic injection molding.

In other respects, the control device in FIG. 2 is the same as the control device described for FIG. 1, so that the same components are marked with the same reference numbers.

The invention is not restricted to the design example described above. Thus the actuator housing 13, the rotary valve 25 and the drive housing 33 can also be manufactured of aluminium instead of plastic.

We claim:

1. A control device for the control of an opening cross sectional area of a flow duct (12), in particular for internal combustion engines comprising an actuator housing (13) having a flow channel (14) with an inlet aperture (16) and an outlet aperture (17) for connection to the flow duct, the flow channel penetrating a regulating chamber having a setting chamber (15) oriented towards the flow channel, a cylindrical stub (20) disposed offstanding at right angles from the actuator housing, and a boss (21) disposed coaxially to said stub and having a locating aperture (22) therein; a rotary valve (25) for controlling the aperture opening, said rotary valve having a control part angled away from a fixing part and projecting into the setting chamber; an actuating drive (27) disposed axially aligned on the stub and having a cup-shaped drive housing (33) pushed onto the stub, said boss (21) being disposed on said actuator housing coaxially with the housing axis and including a coaxial locating aperture (22), a further boss (31) disposed in said drive housing opposite the other boss (21) and provided with a locating aperture (32) coaxial to the other locating aperture (22), a stator provided in the drive housing, a rotor connected torsionally rigid to the fixing part of the rotary valve and held in the locating apertures of the bosses (22, 32) on the actuator housing and on the drive housing, an armature winding with a supply connection, the rotary valve (25) including a control part (251) designed as a cone segment and inclined at an acute angle to the rotor axis, a setting window (24) disposed in a cone envelope plane at the same angle of inclination to the axis of the locating aperture (22) in the boss (21) formed on the actuator housing (13) as that of the control part with respect to the rotor, and a spacing disk (42) located between opposed front faces of a fixing part (252) of the rotary valve (25) and of the boss (21) on the actuator housing (13), said spacing disk (42) having an axial thickness dimensioned in accordance with an air gap desired between the control part (251) of the rotary valve (25) and the setting window (24).

2. A device in accordance with claim 10, in which a spacing disk (43) is located between the front faces, facing towards each other, of the rotor (30) and the boss (31) at the housing base of the drive housing (33), said spacing disk having an axial thickness which is dimensioned according to a desired axial clearance of the motor (30).

3. A device in accordance with claim 1, in which the stub (20) and the boss (21) are formed on the same wall surface of the actuator housing (13), concentrically to one another, and that an arc-shaped slot (23) for the control part (251) of the rotary valve (25) is provided in the wall surface of the actuator housing (13), between the stub (20) and the blind bore (21).

4. A device in accordance with claim 2, in which the stub (20) and the boss (21) are formed on the same wall surface of the actuator housing (13), concentrically to one another, and that an arc-shaped slot (23) for the control part (251) of the rotary valve (25) is provided in the wall surface of the actuator housing (13), between the stub (20) and the blind bore (21).

5. A device in accordance with claim 1, in which the rotor (30) and the fixing part (252) of the rotary valve (25) are connected, torsionally rigid, with a rotor shaft (26) which is supported at its ends via radial bearings (34, 35) in locating apertures (22, 32) of the bosses (21, 31) formed on the actuator housing and drive housing (13, 33).

6. A device in accordance with claim 2, in which the rotor (30) and the fixing part (252) of the rotary valve (25) are connected, torsionally rigid, with a rotor shaft (26) which is supported at its ends via radial bearings (34, 35) in locating apertures (22, 32) of the bosses (21, 31) formed on the actuator housing and drive housing (13, 33).

7. A device in accordance with claim 3, in which the rotor (30) and the fixing part (252) of the rotary valve (25) are connected, torsionally rigid, with a rotor shaft (26) which is supported at its ends viaradial bearings (34, 35) in locating apertures (22, 32) of the bosses (21, 31) formed on the actuator housing and drive housing (13, 33).

8. A device in accordance with claim 1, in which the rotor (30) is located torsionally rigid on a bearing sleeve (44) which is unitary with the fixing part (252) of the rotary valve (25), said rotor (30) is supported via two radial bearings (45, 46) located at an axial distance on an axis (47) held at its ends in the two locating apertures (22, 32) of the bosses (21, 31) formed on the actuator housing and drive housing (13, 33).

9. A device in accordance with claim 2, in which the rotor (30) is located torsionally rigid on a bearing sleeve (44) which is unitary with the fixing part (252) of the rotary valve (25), said rotor (30) is supported via two radial bearings (34, 46) located at an axial distance on an axis (47) held at its ends in the two locating apertures (22, 32) of the bosses (21, 31) formed on the actuator housing and drive housing (13, 33).

10. A device in accordance with claim 3, in which the rotor (30) is located torsionally rigid on a bearing sleeve (44) which is unitary with the fixing part (252) of the rotary valve (25), said rotor (30) is supported via two radial bearings (45, 46) located at an axial distance on an axis (47) held at its ends in the two locating apertures (22, 32) of the bosses (21, 31) formed on the actuator housing and drive housing (13, 33).

11. A device in accordance with claim 8, in which the shaft (47) is pressed in the locating aperture (22) of the boss (21) formed on the actuator housing (13).

12. A device in accordance with claim 9, in which the shaft (47) is pressed in the locating aperture (22) of the boss (21) formed on the actuator housing (13).

13. A device in accordance with claim 10, in which the shaft (47) is pressed in the locating aperture (22) of the boss (21) formed on the actuator housing (13).

14. A device in accordance with claim 8, in which the rotary valve (25) is formed of plastic and that the construction of the bearing sleeve (44) and the fixing of the rotor (30) is effected by means of an injection molding process of the rotary valve (25).

15. A device in accordance with claim 11, in which the rotary valve (25) is formed of plastic and that the construction of the bearing sleeve (44) and the fixing of the rotor (30) is effected by means of an injection molding process of the rotary valve (25).

16. A device in accordance with claim 1, in which the rotor (30) is designed as a two-pole permanent magnet rotor, the stator (28) has two claw poles (38, 39) offset at 180° to one another in a circumferential direction, these claw poles being connected respectively at axially opposing front faces to a ring casing (40) which encompasses the claw poles (38, 39) with radial spacing, and the armature winding (29) lies in the stator (28) as a toroid coil in the ring space formed by the ring casing (40) and the claw poles (38, 39).

17. A device in accordance with claim 2, in which the rotor (30) is designed as a two-pole permanent magnet rotor, the stator (28) has two claw poles (38, 39) offset at 180° to one another in a circumferential direction, these claw poles being connected respectively at axially opposing front faces to a ring casing (40) which encompasses the claw poles (38, 39) with radial spacing, and the armature winding (29) lies in the stator (28) as a toroid coil in the ring space formed by the ring casing (40) and the claw poles (38, 39).

18. A device in accordance with claim 3, in which the rotor (30) is designed as a two-pole permanent magnet rotor, the stator (28) has two claw poles (38, 39) offset at 180° to one another in a circumferential direction, these claw poles being connected respectively at axially opposing front faces to a ring casing (40) which encompasses the claw poles (38, 39) with radial spacing, and the armature winding (29) lies in the stator (28) as a toroid coil in the ring space formed by the ring casing (40) and the claw poles (38, 39).

19. A device in accordance with claim 1, in which the actuator housing (13), the rotary valve (25) and the drive housing (33) are formed of aluminum.

20. A device in accordance with claim 1, in which the actuator housing (13), the rotary valve (25) and the drive housing (33) are formed of plastic.

* * * * *